United States Patent
Sampey

[11] 3,872,288
[45] Mar. 18, 1975

[54] DUAL DISTANCE CALCULATING AND DISPLAY APPARATUS

[75] Inventor: Harry R. Sampey, Vanderbilt, Pa.

[73] Assignee: Pentron Industries, Inc., Cleveland, Ohio

[22] Filed: Mar. 15, 1973

[21] Appl. No.: 341,604

Related U.S. Application Data

[63] Continuation-in-part of Ser. No. 194,401, Nov. 1, 1971, abandoned.

[52] U.S. Cl. ............................. 235/151.32, 235/92
[51] Int. Cl. ........................ H03k 21/00, G06f 7/52
[58] Field of Search .... 235/151.32, 92 DM, 92 DN, 235/92 CC, 92 PL

[56] References Cited
UNITED STATES PATENTS

| | | | |
|---|---|---|---|
| 3,505,503 | 4/1970 | Quivy | 235/92 |
| 3,564,220 | 2/1971 | Peddie et al. | 235/92 |
| 3,571,575 | 3/1971 | Barr et al. | 235/92 |
| 3,648,030 | 3/1972 | Sheperd et al. | 235/92 X |
| 3,705,295 | 12/1972 | Betz | 235/92 |
| 3,705,296 | 12/1972 | Kochi | 235/92 X |
| 3,708,657 | 1/1973 | Kelling | 235/151.11 X |

Primary Examiner—Eugene G. Botz
Assistant Examiner—Edward J. Wise
Attorney, Agent, or Firm—Cushman, Darby & Cushman

[57] ABSTRACT

An improvement for distance measuring instruments wherein distance pulses representing predetermined increments of traveled distance are selectively processed to produce a digital display output representing an accumulated distance in terms of any desired one of a plurality of selected units of measure. In the exemplary embodiment, this is achieved by simultaneously calculating the accumulated distance in terms of the plurality of predetermined units of measure and then selectively routing only one of these calculated outputs to appropriate display apparatus.

4 Claims, 1 Drawing Figure

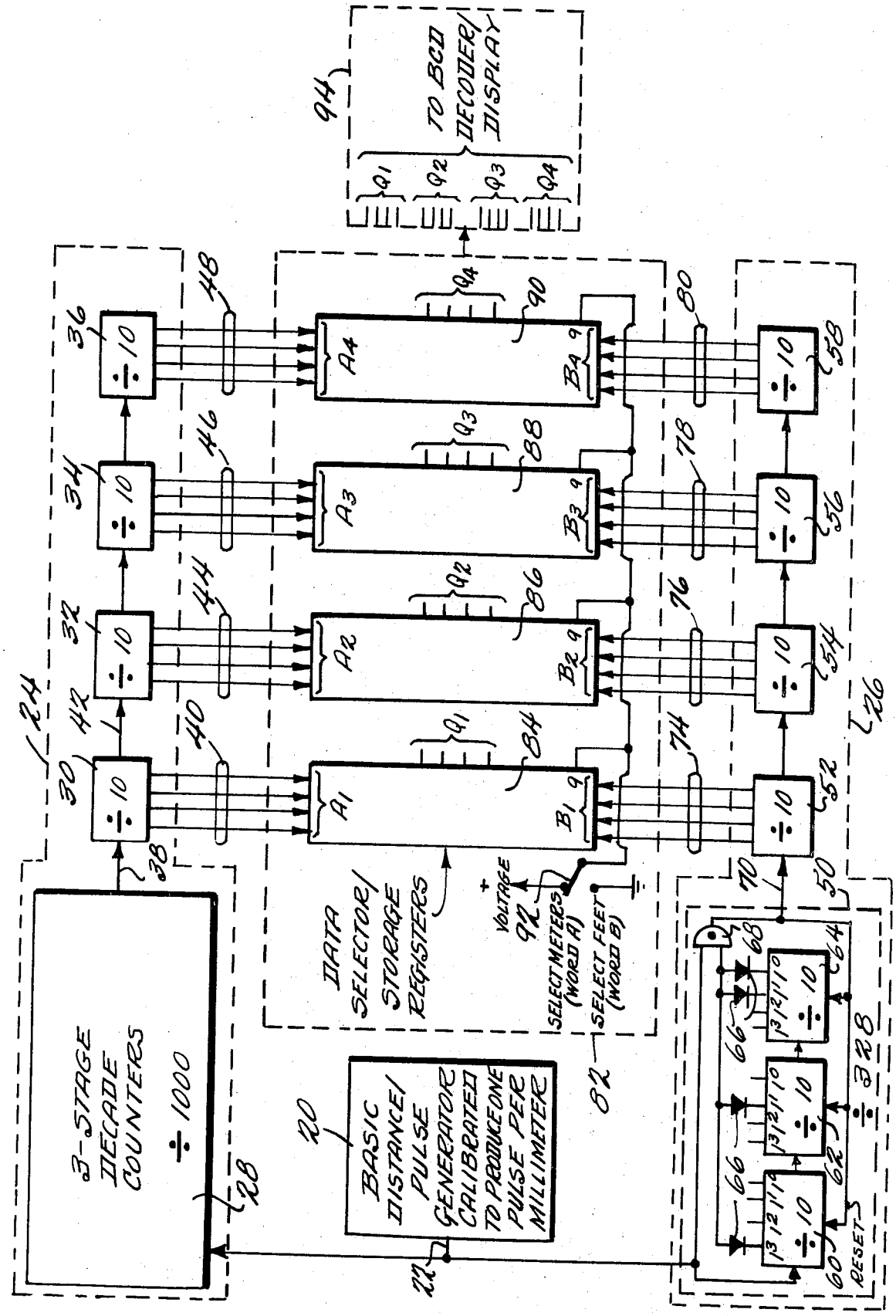

DUAL DISTANCE CALCULATING AND DISPLAY APPARATUS

This is a continuation-in-part of my earlier copending application Ser. No. 194,401 filed Nov. 1, 1971, now abandoned. The disclosure of my earlier co-pending application Ser. No. 194,401 is hereby incorporated by reference into this application.

This invention generally relates to an improvement for distance measuring instruments whereby measurements of accumulated distance are calculated in terms of two or more predetermined units of measure and where the displayed indication of accumulated distance may then be selectively choosen to be in terms of a desired one of those units of measure.

My earlier above-referenced co-pending application discloses a basic distance measuring instrument which may be programmed to produce a display of accumulated distance in terms of a selected unit of measure such as a foot or a meter, etc. A part of this operation involves the gating of a programmed number of clock pulses each time a basic increment of distance has been traversed such that, on the average, each of the clock pulses input to a subsequent chain of cascaded decade counter stages represents some predetermined increment of traveled distance calibrated in terms of the selected unit of measure.

While a distance measuring instrument of this type is thus capable of computing and displaying measured distances in terms of more than one unit of measure, it has been discovered that it is often advantageous and even necessary to be able to simultaneously measure and display traveled distance in terms of more than one unit of measure. That is, after having traversed some particular distance for which a measurement display is desired, it may be desirable or necessary to obtain a final readout in terms of more than one unit of measure. For instance, this would be especially true in a situation such as that to be encountered in the United States in the coming years when conversion from the English to the metric system of measurements is to be accomplished. Here, when one is measuring distance it will often be advantageous or even necessary to include the distance measurements in terms of both feet and/or meters.

While it would be possible for one to calculate the measurement in terms of some other unit of measure once it is known in one given unit of measure, this invention makes such laborious computations unnecessary since it simultaneously calculates the measured accumulated distance in terms of two or more basic units of measure and then selects the calculated output from one of a plurality of computation means for display purposes.

Thus, if one wants to obtain a display output in terms of feet at the end of a traversed distance measurement, a selection switch is thrown to one position where the display apparatus displays the computed output of the computation section calculating the measured distance in terms of feet. On the other hand, by merely throwing the switch to its other position the output of another computation apparatus calculating the measurement in terms of meters may be selected for display thus selectively providing a display output representing the same distance in terms of either feet or meters. Of course, the basic teachings of the exemplary embodiment for dual calculations and display of one output could be easily extended to computation in terms of three or more units of measure with the ultimate selection of one output for display purposes as will be apparent to those in the art.

In the exemplary embodiment, each computation means includes appropriate digital scaling devices for scaling down the basic distance pulses received from an appropriate distance pulse generator. The outputs from these scaling or calculating units are then input to a respective chain of digital decade counters which also constitute a register for holding the accumulated measure of distance. The binary coded decimal (BCD) outputs from the various stages of the decade counter registers are then connected through data selector/storage registers which permit the selection of one set of plural BCD inputs to appear at a common set of output terminals depending upon the voltage present on a selector pin terminal.

The common BCD output terminals of these data selector/storage registers are then connected to respective stages of conventional BCD decoder and display apparatus as will be apparent to those in the art. Accordingly, the accumulated distance actually displayed will be in terms of a particular one of the predetermined units of measure corresponding to the position of a selection switch which, in turn, controls the voltage applied to the selection pin terminal of the data selector/storage registers.

A more complete understanding and appreciation of my invention may be obtained by reference to the accompanying drawing and the following detailed description.

The drawing is a schematic diagram of the electrical circuits for an exemplary embodiment of this invention.

Referring to the drawing, a basic distance/pulse generator calibrated to produce one pulse per millimeter is referenced by numeral 20 and may, for instance, constitute a portion of the apparatus disclosed in my earlier referenced co-pending application. In that particular case, the distance pulses appearing on line 22 would correspond to the gated clock pulses appearing at the output of gate 130 in my earlier co-pending application. In any event, as those in the art will appreciate, the invention described herein will be applicable to any type of distance measuring instrument which is calibrated to produce distance pulses representing predetermined increments of traveled distance.

Solely for explanatory purposes, it will be assumed hereafter that the basic distance pulse generator 20 in the drawing has been calibrated to produce one pulse per millimeter on line 22. However, as should be appreciated, the teaching of this invention would also be applicable for any other desired predetermined calibration of basic distance pulse generator 20.

The distance pulses on line 22 are routed both to a first computation means 24 and to a second computation means 26. The first computation means 24 comprises an initial scaling section 28 and a subsequent plurality of cascaded decade counting-register sections 30, 32, 34 and 36. Since the basic distance pulses already represent one millimeter of traveled distance, the initial scaling section 28 merely needs to divide by 1,000 or, in other words, to produce one output pulse on line 38 for each 1,000 input pulses on line 22 thus causing each of the pulses on line 38 to represent one meter of traveled distance.

The first BCD counter/register 30 counts and registers up to 10 of these meter pulses and produces a BCD output on lines 40 representing the least significant digit of the accumulated distance in terms of meters. Each time the counter 30 completes a cycle through all of its 10 different states, it produces a carry pulse on line 42 which is similarly counted and accumulated in section 32 to produce a BCD output on lines 44 representing the next most significant digit of the accumulated distance. As should now be apparent, the successive stages 34 and 36 function in a similar manner to produce BCD outputs on lines 46 and 48 representing the two next higher significant digits of the accumulated distance in terms of meters.

Each of the counter register sections 30, 32, 34 and 36 may, for instance, comprise commercially available integrated circuits generally identified as type 7490. Furthermore, the three-stage decade counter 28 may similarly comprise 3 cascaded stages of type 7490 integrated circuits as should now be apparent.

In a similar manner, the second computation means 26 also comprises an initial scaler 50 followed by cascaded stages of decade counter/registers 52, 54, 56 and 58. Since the basic distance pulses each represent one millimeter of traveled distance, the initial scaler 50 in the second computation means 26 divides by a factor of 328 to convert into terms of feet.

This may be accomplished, for instance, by inputting the pulses representing one millimeter to a chain of 3 cascaded decade counters 60, 62 and 64, as shown, with the BCD outputs of these decade counters representing the number 328 being connected through respectively associated diodes 66 to one input of an AND gate 68. The other input of the AND 68 is also connected to receive the basic distance pulses emminating from line 22. However, since AND gate 68 is normally disabled so long as any of the terminals connected through diodes 66 are low, none of the basic distance pulses on line 22 are permitted to pass therethrough until the contents of the decade counters 60, 62 and 64 represent the number 328, whereupon, all the diodes 66 are reverse biased and the AND gate 68 is thus enabled to pass an output pulse on line 70 which is also rounted via line 72 to reset all of the decade counters 60, 62 and 64 to an initial contents representing zero.

Accordingly, it should now be appreciated that the decade counters 60, 62 and 64 will repetitively cycle up to a contents of 328 whereupon an output pulse will be generated on line 70 to reset the counters and to begin another repetitive cycle. The net result is that the scaling unit 50 produces one output pulse on line 70 for every 328 input pulses from line 22 thus causing each pulse output on line 70 to represent one foot of traveled distance.

Thereafter, the "foot pulses" on line 70 are counted and accumulated in a chain of 4 cascaded decade counters 52, 54, 56 and 58 to produce binary coded decimal outputs on lines 74, 76, 78 and 80 representing the digits of an accumulated distance measurement in terms of feet as should now be apparent.

The binary coded decimal outputs representing the accumulated distance in terms of meters is connected as shown in the drawing to the inputs $A_1$, $A_2$, $A_3$ and $A_4$ of the selection means 82 while the BCD outputs representing the accumulated distance measurement in terms of feet are connected to the inputs $B_1$, $B_2$, $B_3$ and $B_4$ of the selection means 82.

The selection means 82 comprises a data selection/storage register section for each of the various digits of the accumulated distance measurement as shown at 84, 86, 88 and 90 respectively. These data selection/storage registers may each comprise a commercially available integrated circuit known as type 74L98 which has the property of accepting BCD inputs A and B and of presenting BCD outputs on its Q terminals representing either the BCD inputs at A or the BCD inputs at B depending upon the voltage at a word select terminal 9. If the voltage on pin 9 is maintained high, the Q outputs of the data selector storage registers 84, 86, 88 and 90 will correspond to the BCD word presented at input terminals A while, on the other hand, if the voltage at pin 9 is maintained low the Q outputs of the data selector/storage registers will represent the BCD inputs at terminals B.

As shown in the drawing, the selection of a high or low voltage for the selection pin 9 is accomplished via a selection switch 92 which is shown in a position for applying a high voltage to the selection pin and thus selecting the Q outputs to be representative of the accumulated distance measurement in terms of meters. If the switch were thrown to its downward position, it would present a low voltage on the selection pin 9 and thus causing the Q output of the data selector/storage register to represent the accumulated distance measurement in terms of feet as should now be apparent.

As indicated in the drawing, the $Q_1$, $Q_2$, $Q_3$ and $Q_4$ outputs of the data selector-storage registers 84, 86, 88 and 90 respectively are then connected to a conventional decoding and display apparatus 94 where each of the digits of the selected outputs are decoded and digitally displayed and/or otherwise utilized as desired.

As should now be appreciated, the selection means could also comprise appropriate sets of switches if desired instead of the integrated circuits of type 74L98. Also, while the exemplary embodiment has involved the computation of accumulated distance measurements in terms of feet and meters, any other desired units of measure could just as well be utilized if desired by appropriately changing the initial scaling factor and/or the calibration of the basic distance pulse generator. Furthermore, the initial scaling sections 28 and 50 could, if desired, be made programmable in the fashion described in my earlier referenced co-pending application to permit division by any desired scaling factor, thus permitting the distance pulses input to the chain of decade counters in the respective computation sections to be representative of any desired unit of measure or fraction thereof.

While the exemplary embodiment has been explained in terms of calculating the accumulated distance in only two units of measure and then selectively displaying one of those two resulting calculated outputs, it should now be apparent that the same principle can be utilized to simultaneously calculate the accumulated distance measurement in terms of of any number of desired units of measure and then to selectively route the outputs from only one of such computation means to a display apparatus for display. This could be accomplished with switching of the various outputs from the computation means, per se, and/or could also be accomplished using the data selector/storage registers of the exemplary embodiment by cascading two or more of the data selector/storage registers as will be apparent to those in the art.

While only one exemplary embodiment of this invention has been described in detail herein, those in the art will readily appreciate that the exemplary embodiment may be modified without in any way departing from the true spirit and teaching of this invention. Accordingly, all such modifications are intended to be included within the scope of this invention.

What is claimed is:

1. A distance measuring device for simultaneously processing electrical distance pulses representing predetermined increments of measured distance in a plurality of processing circuits and to thereby produce a plurality of selectable outputs representing accumulated measured distance in terms of a desired selected unit of distance measure, said device comprising:

distance pulse generator means calibrated to produce said electrical distance pulses in a predetermined proportion to a measured distance, first computation means connected to receive and process said distance pulses and to provide a first calculated digital output representing the accumulated measured distance in terms of a first predetermined unit of distance measure, second computation means also connected to receive and process said distance pulses and to provide a second calculated digital output representing accumulated measured distance in terms of a second predetermined unit of distance measure which differs from said first unit of measure by other than a factor of ten, and selection means connected to receive the calculated digital outputs of both said first computation means and said second computation means for selectively providing a desired selected one calculated digital output representing accumulated measured distance in terms of one of said first predetermined unit of distance measure and said second predetermined unit of distance measure, and decoding and display means connected to receive said selected one calculated digital output and to decode and visually display said selected output.

2. A device as in claim 1 wherein both said first and second computation means comprise:

an initial scaling section connected to provide a predetermined ratio between the number of input distance pulses received thereby and the number of pulses produced thereby, said predetermined ratio being different by other than a factor of ten for said first and second computation means respectively, and a plurality of cascaded decade counters connected to receive the pulses produced by said initial scaling section whereby the output from each decade counter represents the digit value of the overall respectively corresponding first and second outputs.

3. A device as in claim 2 wherein said selection means comprises:

data selector means for receiving said first and second outputs and for providing said selected output corresponding to one of said first and second outputs depending upon the value of a selection signal supplied thereto, and switch means connected for selectively providing said selection signal to the data selector means thereby causing the selected output to represent the desired one of the first and second predetermined units of distance measure.

4. A device as in claim 3 wherein said first, second and selected outputs are all in the form of binary coded decimal electrical signals to represent a plurality of decimal digit values.

* * * * *